(12) United States Patent
Hepworth et al.

(10) Patent No.: US 7,097,099 B2
(45) Date of Patent: Aug. 29, 2006

(54) DATA COLLECTION DEVICE WITH INTEGRATED DATA TRANSLATION

(75) Inventors: Paul Hepworth, Riverton, UT (US); George Powell, Sandy, UT (US)

(73) Assignee: The Code Corporation, Draper, UT (US)

( * ) Notice: Subject to any disclaimer, the term of this patent is extended or adjusted under 35 U.S.C. 154(b) by 186 days.

(21) Appl. No.: 10/774,245

(22) Filed: Feb. 6, 2004

(65) Prior Publication Data

US 2004/0158604 A1   Aug. 12, 2004

Related U.S. Application Data

(63) Continuation-in-part of application No. 10/623,747, filed on Jul. 21, 2003.

(60) Provisional application No. 60/399,215, filed on Jul. 29, 2002.

(51) Int. Cl.
G06K 7/10 (2006.01)
G06K 7/00 (2006.01)

(52) U.S. Cl. .................. 235/435; 235/462.01; 235/375; 235/454

(58) Field of Classification Search ............... 235/375, 235/435, 462.01, 462.07, 454
See application file for complete search history.

(56) References Cited

U.S. PATENT DOCUMENTS

| | | | |
|---|---|---|---|
| 3,513,320 A | 5/1970 | Weldon |
| 4,488,679 A | 12/1984 | Bockholt et al. |
| 4,654,718 A | 3/1987 | Sueyoshi |
| 4,752,675 A | 6/1988 | Zetmeir |
| 4,896,029 A | 1/1990 | Chandler et al. |
| 4,958,064 A | 9/1990 | Kirkpatrick |
| 4,998,010 A | 3/1991 | Chandler et al. |
| 5,047,614 A | 9/1991 | Bianco |
| 5,113,445 A | 5/1992 | Wang |
| 5,153,418 A | 10/1992 | Batterman et al. |
| 5,159,635 A | 10/1992 | Wang |
| 5,189,292 A | 2/1993 | Batterman et al. |
| 5,223,701 A | 6/1993 | Batterman et al. |
| 5,343,028 A | 8/1994 | Figarella et al. |
| 5,352,878 A | 10/1994 | Smith et al. |

(Continued)

FOREIGN PATENT DOCUMENTS

EP   0837406 A2   4/1998

(Continued)

OTHER PUBLICATIONS

Internet Article: "An early history of software engineering by Robert L. Glass" copyright 1999; posted by Ken Anderson.*

(Continued)

*Primary Examiner*—Daniel Stcyr
*Assistant Examiner*—Daniel A. Hess
(74) *Attorney, Agent, or Firm*—Madson & Austin

(57) ABSTRACT

A data collection device (10) reads a machine readable data storage medium (38) comprising data encoded in a machine readable format. The data collection device (10) comprising a code reading system (21), a processor (20), and a communication module (26). The code reading system detects the data encoded in the machine readable data storage medium (38) and generates digital data representative thereof. The processor (20) operates an embedded decoder system (76). The embedded decoder system (76) comprises a decoder module (72) and an interpreter module (84). The decoder module (76) receives the digital data and generates decoded data (134). The interpreter module (84) receives the decoded data (134) and manipulating the decoded data (134) in accordance with the plurality of data manipulation commands defined in a rules file (85) to generate formatted data (136). The communication module (26) transfers the formatted data to a remote system.

36 Claims, 7 Drawing Sheets

U.S. PATENT DOCUMENTS

| | | | |
|---|---|---|---|
| 5,412,196 | A | 5/1995 | Surka |
| 5,428,211 | A | 6/1995 | Zheng et al. |
| 5,438,188 | A | 8/1995 | Surka |
| 5,465,291 | A | 11/1995 | Barrus et al. |
| 5,478,999 | A | 12/1995 | Figarella et al. |
| 5,483,052 | A | 1/1996 | Smith, III et al. |
| 5,493,105 | A | 2/1996 | Desai |
| 5,545,887 | A | 8/1996 | Smith et al. |
| 5,604,640 | A | 2/1997 | Zipf et al. |
| 5,612,527 | A | 3/1997 | Ovadia |
| 5,804,803 | A | 9/1998 | Cragun et al. |
| 5,869,819 | A | 2/1999 | Knowles et al. |
| 5,903,729 | A | 5/1999 | Reber et al. |
| 5,905,248 | A | 5/1999 | Russell et al. |
| 5,905,251 | A | 5/1999 | Knowles |
| 5,933,634 | A | 8/1999 | Enokido et al. |
| 5,933,829 | A | 8/1999 | Durst et al. |
| 5,938,726 | A | 8/1999 | Reber et al. |
| 5,978,773 | A | 11/1999 | Hudetz et al. |
| 5,992,752 | A | 11/1999 | Wilz, Sr. et al. |
| 6,012,102 | A | 1/2000 | Shachar |
| 6,027,024 | A | 2/2000 | Knowles |
| 6,032,195 | A | 2/2000 | Reber et al. |
| 6,068,188 | A | 5/2000 | Knowles |
| 6,076,733 | A | 6/2000 | Wilz, Sr. et al. |
| 6,098,106 | A | 8/2000 | Philyaw et al. |
| 6,108,656 | A | 8/2000 | Durst et al. |
| 6,138,151 | A | 10/2000 | Reber et al. |
| 6,154,738 | A | 11/2000 | Call |
| 6,328,211 | B1 * | 12/2001 | Wilz et al. ............. 235/462.01 |
| 6,377,986 | B1 | 4/2002 | Philyaw et al. |
| 6,384,744 | B1 | 5/2002 | Philyaw et al. |
| 6,535,883 | B1 | 3/2003 | Lee et al. |
| 6,564,249 | B1 | 5/2003 | Shiigi |
| 6,584,601 | B1 | 6/2003 | Kodosky et al. |
| 2002/0144017 | A1 | 10/2002 | Hepworth et al. |
| 2002/0147743 | A1 | 10/2002 | Le et al. |
| 2002/0149793 | A1 | 10/2002 | Hepworth et al. |
| 2002/0152241 | A1 | 10/2002 | Hepworth et al. |
| 2003/0163396 | A1 | 8/2003 | Blankevoort et al. |
| 2003/0163800 | A1 | 8/2003 | Zhou et al. |

FOREIGN PATENT DOCUMENTS

| | | |
|---|---|---|
| WO | WO98/03923 | 1/1998 |
| WO | WO98/06055 | 2/1998 |
| WO | WO98/24036 | 6/1998 |
| WO | WO98/40823 | 9/1998 |
| WO | WO98/49813 | 11/1998 |
| WO | WO99/04326 | 1/1999 |

OTHER PUBLICATIONS

U.S. Appl. No. 10/420,527, Hepworth et al.

"Punched Cards to Bar Codes," Benjamin Nelson, Helmers Publishing, Inc. 1997, pp. 1-16.

"MiniCode," http://www.omniplanar.com/minicode.html, pp. 1-10, May 17, 1999.

* cited by examiner

| Command Set 87 | |
|---|---|
| extract *pattern* | 87a |
| extractRange *start count* | 87b |
| insert *position arg* | 87c |
| deleteFirst *pattern* | 87d |
| deleteAll *pattern* | 87e |
| deleteRange *start count* | 87f |
| translateFirst *old new* | 87g |
| translateAll *old new* | 87h |
| tag *arg* | 87i |
| accept *arg* | 87j |
| route *port format tag tag tag . . .* | 87k |
| passthrough *arg* | 87m |

Figure 4

```
200 extract ".+"
    # DATE (mm/dd/yy to dd/mm/20yy)
    210 extract "(^|;)[0-9]{2}/[0-9]{2}/[0-9]{2}(;|$)"
        211 deleteAll ";"
        212 extractRange 1 3
        213 insert 4 extracted
        214 insert 7 20
        215 passthrough buffer
        216 passthrough ","

# STC
    220 extract "(^|;)[0-9A-Za-z]{6}(;|$)"
        221 deleteAll ";"
        222 passthrough buffer
        223 passthrough ","

# QTY
    230 extract "(^|;)[0-9]{4}(;|$)"
        231 deleteAll ";"
        232 passthrough buffer 240 extract".+"
        241 deleteFirst ".+"
```

Figure 5

DATA COLLECTION DEVICE WITH INTEGRATED DATA TRANSLATION

CROSS REFERENCE TO RELATED APPLICATIONS

This application is a continuation-in-part of U.S. patent application Ser. No. 10/623,747, filed Jul. 21, 2003, for "Systems and Methods for Interfacing Multiple Types of Object Identifiers and Object Identifier Readers to Multiple Types of Applications," with inventors Paul J. Hepworth, George Powell, and Weiyang Zhou. Application Ser. No. 10/623,747 claims priority from U.S. Provisional Patent Application Ser. No. 60/399,215, filed Jul. 29, 2002, for "System and Method of Interfacing Multiple Types of Object Identifiers and Object Identifier Readers to Multiple Types of Applications," with inventors Paul Hepworth, George Powell, and Weiyang Zhou. The contents of application Ser. No. 10/623,747 and application Ser. No. 60/399, 215 are hereby incorporated by reference in their entirety.

TECHNICAL FIELD

The present invention relates generally to a data collection device for obtaining data from a machine readable data storage medium. More specifically, the present invention relates to a data collection device which includes an interpreter for manipulating data read from a machine readable data storage medium in accordance with a plurality of data manipulation instructions stored in an instruction file.

BACKGROUND OF THE INVENTION

A machine readable data storage medium is used to store data related to a document, product, or other tangible object to which the data storage medium is embedded or attached. Examples of such storage media include radio frequency identification tags, magnetic stripes, and machine-readable graphical codes.

A graphical code is a graphical representation of information that consists of multiple code elements having different light reflective or light emissive properties. Examples of types of graphical codes include bar codes, data matrix codes, MaxiCodes, MICR text, optical character recognition text, and similarly formatted data.

Traditional data collection devices, for example data collection devices for reading graphical codes (including linear laser scanners, raster laser scanners, linear CCD imaging readers, and 2D array imaging readers) detect illumination reflected from a graphical code and generate a digital signal representative of the reflected illumination. In a linear or raster laser scanner, the digital signal is the result of digitizing a voltage signal output by a photo sensor that detects reflected laser illumination as the laser scans across a target area. In the imaging readers, the digital signal is the result of digitizing a voltage signal that represents sequential read out of pixels on the linear CCD or 2D array when an image of the target area is focus thereon.

The digital signal is provided to an embedded decoder system (e.g. a processor which executes a decoder application from firmware) which generates a decoded value. The decoder system not only decodes the digital signal, but it also drives a serial interface circuit (such as a UART) for transmitting the decoded value to a compatible serial interface circuit of a remote computer running a software application that will use the decoded value (e.g. a data collection application).

Traditional data collection devices such as RFID tag readers detect a modulated RF signal carrier emitted from the tag and generate a digital signal representative of base band data. The digital signal is provided to an embedded decoder system. Again, the decoder system not only decodes the digital signal, but it also drives a serial interface circuit for transmitting the decoded value to a compatible serial interface circuit of a remote computer running a data collection application.

In all such data collection devices, it is possible to customize the decoder firmware such that it makes format changes in the decoded value before output to the serial interface circuit. Examples of format changes that are readily implemented in customized decoder firmware include: i) adding and/or deleting prefix characters to the decoded data; and ii) adding and/or deleting suffix characters to the decoded data.

It is common for a company that is replacing existing data collection devices with new data collection devices to require that the supplier of the new data collection devices write customized decoder firmware such that the data output by the new data collection devices has the same prefix and suffix characters as data output by the existing data collection devices. This solution is more desirable than modifying legacy systems to accept data in a different format. It is also more desirable than writing, installing, and maintaining a middleware application to run in conjunction with the data collection application for the purpose of converting data to a format compatible with the legacy data collection application.

However, there are several problems associated with customizing decoder firmware. First, source code to the decoder firmware is typically proprietary to the manufacturer of the reader. As such, the end user of a reader does not have access to the source code and, if the end user desires custom firmware, the end user will contract with the data collection device manufacturer to write the customizations. This process includes the time and cost inefficiencies that typically exist when one entity specifies a requirement and contracts with another entity to implement the specified requirement. This process also includes the time and cost inefficiencies of contracting with the reader manufacturer to manage version control and otherwise maintain the customized firmware.

Portable hand held data computers also exist. A portable data computer includes, in the same housing as the data collection device, a general purpose computer system for running software applications on top of an operating system.

In one embodiment of portable data computers, the general purpose computer and the data collection device are architecturally distinct systems operating within the same hand held housing. More specifically, the data collection device is coupled to (and provides decoded values to) the general purpose computer over a serial interface such as a (UART).

In a second embodiment, the digital signal is provided to the general purpose computer system over a serial interface and decoding is performed by a software application running on the general purpose computer system.

The general purpose computer system of a portable data computer enables any company to obtain the application interfaces for the operating system and write a customized application for running thereon. It is conceivable that such an application could be middleware used to reformat decoded data to a format compatible with a legacy data collection application. This system is architecturally a middleware solution that has simply moved the middleware from a remote server to the general purpose computer system of the portable data computer.

This middleware software solution has several drawbacks. First, the cost of a portable data computer is significantly higher than the cost of a data collection device. There are additional hardware costs associating with implementing a general purpose computer in a small hand held housing and there are additional software costs associated with providing an operating system for the general purpose computer. Secondly, the size and weight of a portable data computer are greater than a data collection device.

For these reasons, what is needed is a data collection device that includes the ability to translate, format, and route decoded data in a specified format without requiring customized decoder firmware and without requiring installation of a middleware application on a portable data computer.

SUMMARY OF THE INVENTION

A first aspect of the present invention is to provide a data collection device (such as an RF ID tag reader or a graphical code reader) for reading a machine readable data storage medium (such as an RF ID tag or a printed graphical code). A graphical code comprises data encoded in code elements of varying reflectivity. The data collection device comprises a processor and, coupled to the processor: i) a code reading system, ii) a non-volatile storage, iii) a memory, and iv) a communication module.

The code reading system detects a characteristic of the machine readable data storage medium and generates digital data representative thereof. For example, the code reading system could detect illumination reflected from the graphical code and generates digital data representative of the code elements for storage in the memory.

The processor operates an embedded decoder system which comprises a decoder module and an interpreter module. The decoder module receives the digital data, determines the data encoded therein, and generates decoded data. The interpreter module receives the decoded data and manipulates the decoded data in accordance with a plurality of data manipulation commands defined in a rules file to generate formatted data. The communication module then transfers the formatted data to a remote system.

The non volatile storage stores the rules file. The rules file defines the plurality of data manipulation commands to be performed on decoded data to generate formatted data. In the exemplary embodiment, the rules file is a source code or script file in human perceivable form and the plurality of data manipulation commands are defined utilizing text commands and arguments within a programming language recognized by the interpreter module.

The interpreter module may comprise an expression library which includes a command set. The command set may be the universe of data manipulation commands recognized by the interpreter module and available for use in the rules file.

The expression library associates, with each data manipulation command, an instruction for performing the data manipulation command. As such, the interpreter module provides for manipulating the decoded data by, for each data manipulation defined in the rules file, performing the instruction associated with the data manipulation command in the expression library.

In a first embodiment, the instruction associated with each data manipulation command is a compiling instruction for compiling machine readable instructions which are recognizable by a data handling module or virtual machine.

In this first embodiment, the interpreter module comprises a compiler module and the data handling module, both in native machine code for execution by the processor. The compiler module uses the compiling instruction to compile machine readable instructions and the data handling module manipulates the decoded data by retrieving the machine readable instructions and performing the data manipulations in accordance therewith.

In a second embodiment of the present invention, the instruction associated with each data manipulation is a compiling instruction for building a native machine code data handling module for performing the data manipulation.

In this second embodiment, the interpreter module comprises a compiler module. The compiler module uses the compiling instruction to compile the data handling module which, when operated by the processor, manipulates the decoded data in accordance with the plurality of data manipulation commands defined in the rules file. The interpreter module manipulates the decoded data by operating the data handling module.

A second aspect of the present invention is to provide data collection device for reading a machine readable data storage medium such as an RF ID tag or a graphical code. The data collection device of this second aspect comprises a processor and, coupled to the processor: i) a medium reading system, ii) a non-volatile storage, iii) a memory, and iv) a communication module.

The medium reading system detects a characteristic of the machine readable data storage medium and generates digital data representative thereof for storage in the memory.

In a graphical code reader, the medium reading system may be a code reading system which detects illumination reflected from a graphical code and generates digital data representative of the code elements for storage in the memory.

The memory comprises instructions executable by the processor. The instructions comprise a decoder module and an interpreter module. The decoder module comprises executable code for receiving the digital data, determining the data encoded in the data elements, and generating decoded data. The interpreter module comprises executable code for reading a plurality of data manipulation commands from a rules file and manipulating the decoded data in accordance with the plurality of data manipulation commands to generate formatted data. The communication module then transfers the formatted data to a remote system.

The interpreter module may comprise an expression library which includes a command set. The command set may be the universe of data manipulation commands available for use in the rules file. The expression library associates, with each data manipulation command, an instruction for performing the data manipulation command.

The interpreter module provides for manipulating the decoded data by, for each data manipulation defined in the rules file, performing the instruction associated with the data manipulation command in the expression library.

Again, in a first embodiment, the instruction associated with each data manipulation command is a compiling instruction for compiling machine readable instructions which are recognizable by a data handling module or virtual machine. And, in a second embodiment, the instruction associated with each data manipulation is a compiling instruction for building a native machine code data handling module for performing the data manipulation.

For a better understanding of the present invention, together with other and further aspects thereof, reference is made to the following description, taken in conjunction with the accompanying drawings. The scope of the invention is set forth in the appended claims.

BRIEF DESCRIPTION OF THE DRAWINGS

FIG. 4 is an exemplary command set in accordance with one embodiment of the present invention;

FIG. 5 is script representing a rules file in accordance with one embodiment of the present invention;

DETAILED DESCRIPTION OF THE INVENTION

Figure 1:
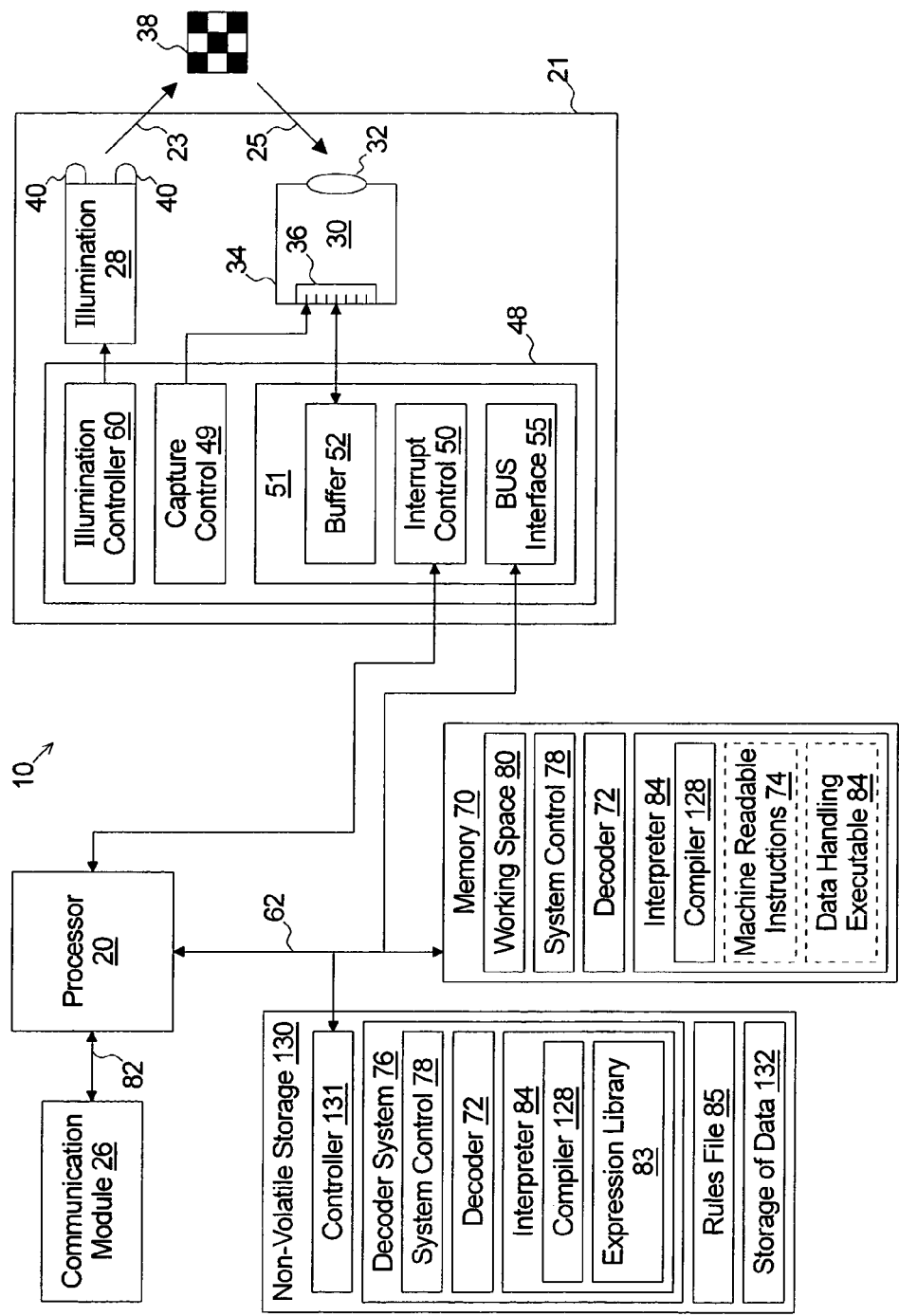
FIG. 1 is a block diagram representing a data collection device in accordance with one embodiment of the present invention.

The present invention is now described in detail with reference to the drawings. In the drawings, each element with a reference number is similar to other elements with the same reference number independent of any letter designation following the reference number. In the text, a reference number with a specific letter designation following the reference number refers to the specific element with the number and letter designation and a reference number without a specific letter designation refers to all elements with the same reference number independent of any letter designation following the reference number in the drawings.

Certain functions discussed in this specification have been grouped into elements referred to as circuits, modules, or engines. Such grouping of functions is for clarity of the discussion only and those skilled in the art of software design understand that grouping of functions within modular software design is a matter of design choice. Further, each such term circuit, module, or engine as used throughout this specification is intended to encompass a hardware circuit (whether discrete elements or an integrated circuit block), a processor executing embedded code, or a combination of a hardware circuit and a processor executing code, or other combinations of the above known to those skilled in the art.

FIG. 1 shows a block diagram of an exemplary two dimensional imaging based code reader 10. Although the present invention will be described as embodied in such a 2D imaging based reader, it should be readily apparent to those skilled in the art that the invention may be readily implemented in a laser based data collection device (both linear and raster) or a linear photo sensor array data collection device.

The data collection device 10 comprises a code reading system 21, a processor 20, a random access memory 70, a non volatile storage (such as flash memory) 130, and communication module 26.

The code reading system 21 comprises a code reading interface circuit 48, an imaging module 30, and an illumination assembly 28. The code reading interface circuit 48 may be implemented on a field programmable gate array (FPGA), an application specific integrated circuit (ASIC), or similar circuit structure. The circuits of the code reading interface circuit 48 comprise an illumination control circuit 60, an image capture control circuit 49, and image storage circuits 51. The image storage circuits 51 include an image buffer 52, an interrupt control circuit 50, and a bus interface 55.

In the exemplary embodiment, a bus 62 interconnects the processor 20 to each of a non-volatile storage controller 131 of the non-volatile storage 130, the memory 70, and the code reading interface circuit 48 of the code reading system 21. A peripheral bus 82 interconnects the processor 20 to the communication module 26.

While each of the above components is shown as a separate component on the block diagram of FIG. 1, it is envisioned that some of the components may be embedded within other components. For example, while the illumination assembly 28 and the imaging module 30 are shown separately for clarity, those skilled in the art will understand that the functions and structure of the illumination assembly 28 may be readily implemented as part of the imaging module 30. As another example, the processor 20 may include the communication module 26, and a portion of the memory 70 embedded within the processor 20. It is envisioned that even more components will be embedded within processors that are expected to be available in the future. Those skilled in the art will recognize that combining and embedding components does not alter the functionality required of each component to support the inventions described herein.

The non-volatile storage controller 131, in combination with driver code operated by the processor 20, controls the reading and writing to data to the non-volatile storage 130. For purposes of illustrating the present invention, the non-volatile storage 130 stores an embedded decoder system 76 and a rules file 85. The non-volatile storage 130 may further include files for the storage of data 132 generated during operation of the reader 10 if the reader 10 is a "batch mode" reader.

The embedded decoder system 76 comprises one or more files that have been compiled to native machine code and are loaded into the memory 70 at start up for execution by the processor 20. For purposes of illustrating the present invention, the embedded decoder system 76 comprises a system control module 78, a decoder module 72, and an interpreter module 84.

Figure 2:
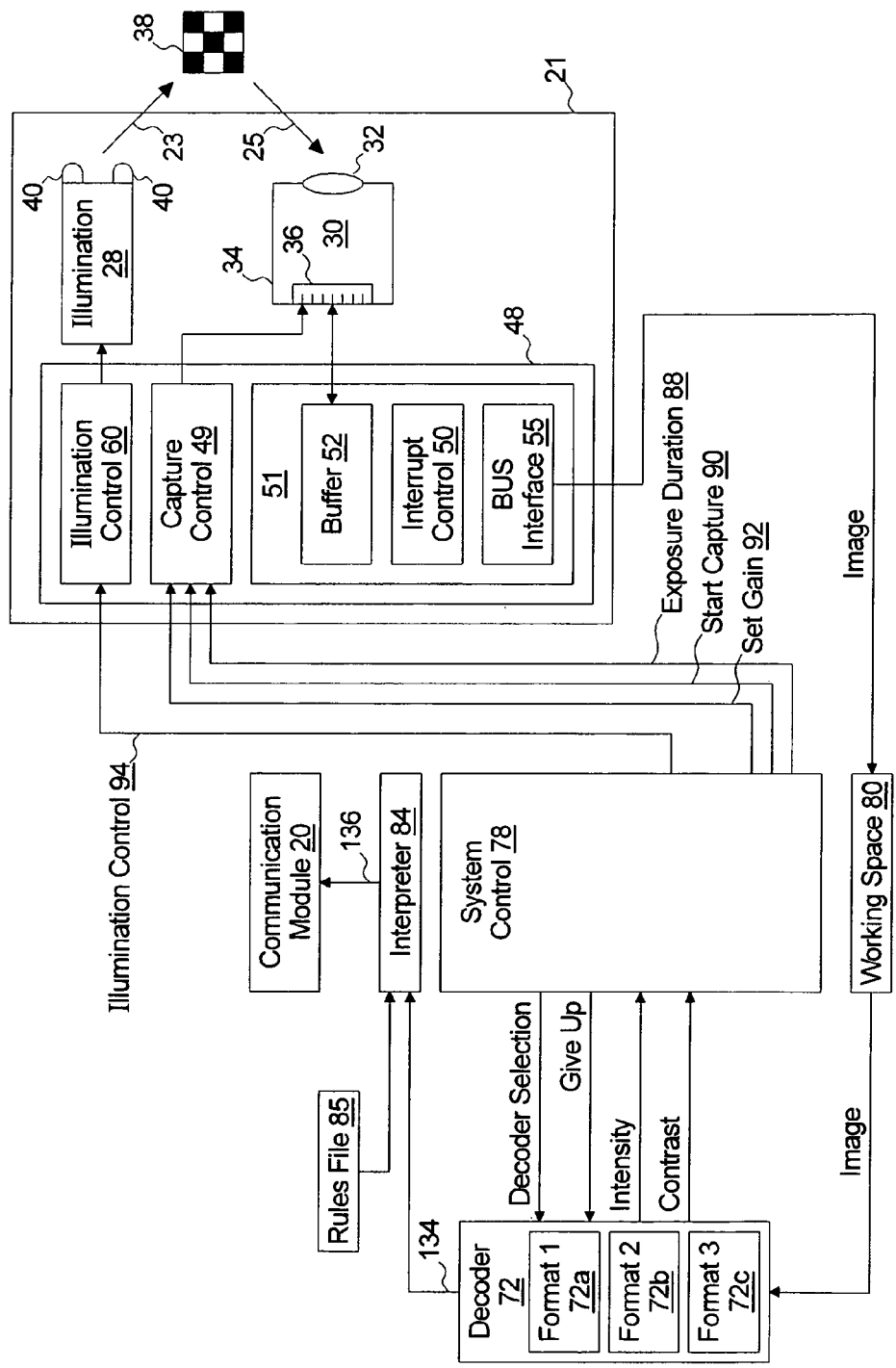
FIG. 2 is a block diagram representing exemplary interaction between various components of the data collection device of FIG. 1.

FIG. 2 is a block diagram useful for discussion of the operation and interaction between the various components discussed above. Referring to FIG. 2 in conjunction with FIG. 1, the system control module 78 operates as the "hub" that controls the timing and sequence of processing calls to each of the decoder module 72, the interpreter module 84, and each of the illumination control circuit 60, the image capture control circuit 49, and the image storage circuits 51 of the code reading interface circuit 48. When each such module or circuit has completed its operation, control is returned to the system control module 78.

The illumination module 28 includes a plurality of illumination elements 40 and is coupled to the illumination control circuit 60. The illumination control circuit 60 powers each element 40 in response to illumination control signals 94 (both timing and illumination intensity) provided by the system control module 78.

The imaging module 30 includes a 2d photo sensor array system 36, a darkroom housing 34, and an optic system 32 which, in combination operate as a camera for capturing an image of a graphical code 38 within a target area.

The optic system 32 may include one or more lens elements for focusing an image of a graphical code 38 in the target area onto the matrix of light sensitive elements of the 2D photo sensor array system 36. A more detailed discussion of an exemplary optic system is included in U.S. Pat. No. 6,619,547, issued Sep. 16, 2003, for "Image-Based Graphical Code Reader Device with Multi-Functional Optical Element and Converging Laser Targeting," with inventors Blake Crowther, Ryan Hyde, Collin Lewis, and George Powell, the contents of which are incorporated herein by reference.

The darkroom housing 34 mounts the optic system 32 with respect to the photo sensor array system 36 such that an image of the target area is well focused onto the matrix of light sensitive elements and shields the light sensitive elements from ambient (unfocused) illumination.

Each light sensitive element accumulates a charge proportional to the intensity of illumination incident thereon over the duration of an exposure period. The 2d photo sensor array system 36, in addition to the matrix of light sensitive elements, includes array circuits which: i) start an exposure period, ii) sequentially read out the accumulated charge on each photo sensor element at termination of an exposure period to generate a voltage signal representing the sequential read out, iii) adjust gain of a voltage signal, and iv) generate digital image data which is a sequence of digital values representing the accumulated charge on each photo sensor element.

The array circuits that start an exposure period operate in response to receiving a "Start Capture" signal 90 from the system control module 78 (through the capture control circuits 49 of the code reading interface circuit 48) and terminate the exposure period after exposing the photo sensor elements for an "Exposure Duration" value 88 received from the system control module 78. The array circuits set the gain of the voltage signal in response to receiving a "Gain Value" 92 from the system control module 78.

The image storage circuits 51 serve the function of transferring the digital image data from the imaging module 30 to a working space 80 of the memory 70. More specifically: i) the image buffer 52 receives and stores digital image data from the imaging module 30; ii) the interrupt control circuit 50 functions to provide an interrupt signal to the processor 20 when the image buffer 52 is full; and iii) the bus interface circuit 55 operates to transport the digital image data over the bus 62 to the working space 80 utilizing either direct memory access, reading and writing sub-routes of the processor 20, or a combination thereof.

The decoder module 72 performs applicable image processing and code element recognition to identify and decode the graphical code 38 within the digital image data. The decoder module 72 includes a plurality of decoders 72a–72c. Each decoder 72a–72c, when operated by the processor 20, attempts to recognize and decode a graphical code of a certain format (UPC, Maxicode, PDF-417 ect) within the digital image data that has been stored in the working space 80 by the image storage circuits 51—and, if successful, generates decoded data 134. Each decoder 72a–72c is independently called by a decoder selection signal (and terminated by a give up signal) provided by the system control module 78.

The system control module 78 may select the order that each decoder 72a–72c is called (and the "give up" time allotted to each decoder) based on various techniques to optimize decoder performance.

The interpreter module 84 translates, routes, and otherwise manipulates decoded data 134 as defined by a plurality of data manipulation commands set forth in the rules file 85 to generate formatted data 136 and route the formatted data 136 to the communication module 26.

The communication module 26 may be a known communication controller system for transporting data to a remote computing system. Examples include a serial link UART, a network interface circuit, a BlueTooth wireless controller, an 802.11 wireless controller, or other known communication systems. The communication module 26 functions to transport the formatted data 136 to a remote computer system operating an application that utilizes the formatted data.

Figure 3:
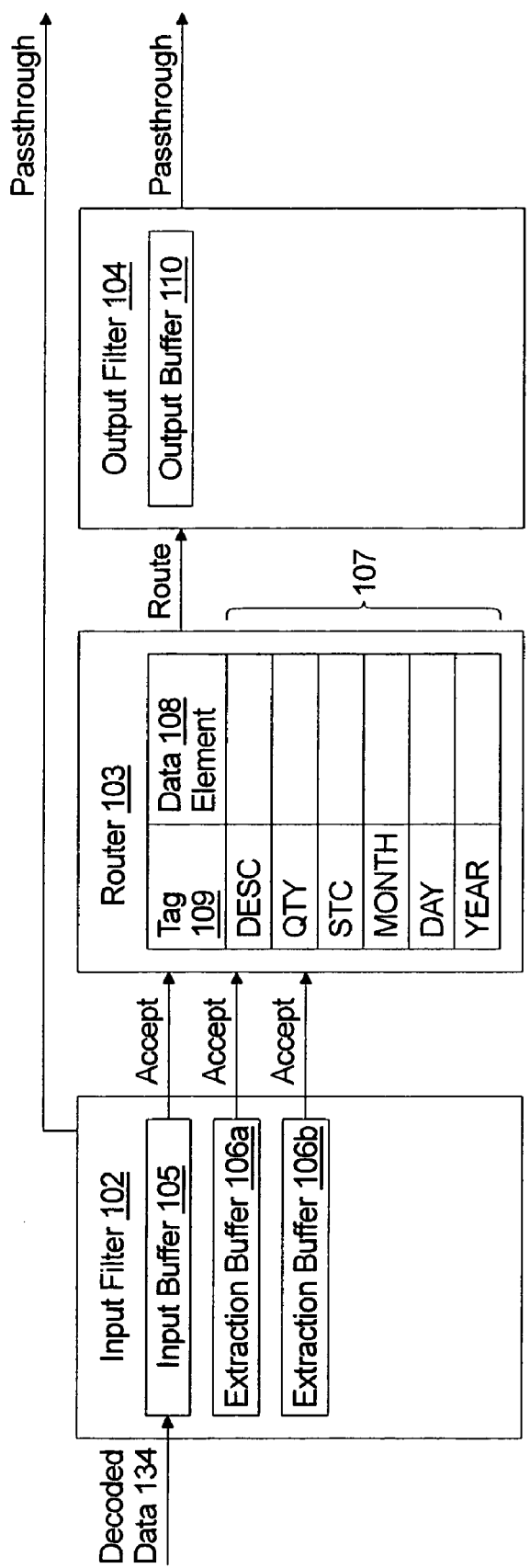
FIG. 3 is a block diagram representing logical components of an interpreter module in accordance with one embodiment of the present invention.

The block diagram of FIG. 3 represents logical structure and operation of the interpreter module 84 which, as discussed manipulates decoded data 134 in accordance with commands set forth in the rules file 85. Referring to FIG. 3 in conjunction with FIGS. 1 and 2, the commands within the rules file 85 may be logically structured such that the interpreter module 84 implements a combination of an input filter 102, a router 103, and an output filter 104.

The input filter 102 is a logical group of commands that convert decoded data into predefined data elements 108 and to associate each data element 108 with a predefined label or data tag (such as an XML data tag) 109 which identifies the significance of the data. For example, the input filter 102 may receive a decoded value that represents a calendar date in DD/MM/YY format (such as 31/10/03) and convert the decoded value into three tag/data element pairs: [DAY] 31; [MONTH] 10; and [YEAR] 2003—each of which is stored in a tagged buffer 107 of the router 103.

The router 103 identifies a sequence of tag/data element pairs from the tagged buffer 107 for output. For example, all date data may be sent to a particular legacy application in MMDDYY format. The router 103 exports the tag/data element pairs to the output filter 104 in MONTH, DAY, YEAR order.

The output filter 104 converts the tag/data element pairs into the particular data format for output by the reader, in this example MMDDYY format. In this example, the conversion requires simply removing the data tags.

It should be appreciated that in this exemplary embodiment the reader 10 includes only a single transmission medium (such as a serial link) to only a single application of a remote computer. Therefore, all data (if not discarded) must be routed to such application over such communication circuit. However, in the event that data could be routed to different data output systems, the system may logically include multiple output filters and the router 103 would not only select the order and sequence of tag/data element pairs for output, but would also select the particular output system. A single tag/data element pair may be output in different formats (or the same format) to two or more output systems.

FIG. 5 represents an exemplary rules file 85. The exemplary rules file 85 for manipulating date, stock code, and quantity information that is read from a graphical code (for example a two-dimensional data matrix). For purposes of the example, it is assumed that the date, stock code, and quantity information is encoded in the graphical code as a semi-colon delimited file with the first field being a date represented in "mm/dd/yy" format, the second field being a stock code represented by six alpha-numeric characters, the third field being a quantity represented by four numeric characters, and the fourth field being a description represented by ten alpha characters.

The exemplary rules file 85 of FIG. 5 manipulates the decoded data such that the output of the reader 10 is a comma delimited data stream that includes, in sequence, the date (in dd/mm/yyyy) format, the stock code, and the quantity.

As discussed, the rules file 85 may be a source code script file or other human readable data file. The contents of the rules file 85 describes various data translation and routing instructions utilizing a pre-defined programming language recognized by the interpreter module. More specifically, and with reference to FIG. 4, the pre-defined programming language comprises a plurality of data manipulation commands 87*a*–87*m* which, in the aggregate form a command set 87. The command set 87 is the universe of data manipulation commands that may be included within a rules file 85. The exemplary data manipulation commands within the command set 87 include:

Command 87*a* represents a command called "extract" and it includes a single argument referred to as "pattern". The "extract" command is a command to extract the portion of the data that matches the "pattern" and writes such extracted data to the extraction buffer. The matching criteria of the "extract" command is that the data must have the defined "pattern". The argument "pattern" may be defined as a regular expression—as is known in the art of text processing.

Command 87*b* represents a command called "extractRange" and it includes an argument referred to as "start" and an argument referred to as "count". The "extractRange" command is a command to extract a portion of the data that is "count" number of characters in length beginning at the position "start" and write such extracted data to the extraction buffer. Each of "start" and "count" are numerical values.

Command 87*c* represents a command called "insert" and it includes an argument referred to as "position" and an argument referred to as "arg". The "insert" command is a command that inserts the specified "arg" at the specified "position". The specified "position" may be a number specifying the character position or it may be a predefined expression such as "beginning", "end", or "extracted"—which is the point of the most recent extraction. "arg" may be a specified character string or may identify a buffer, such as the extraction buffer, which includes a character sting for insertion.

Command 87*d* represents a command called "deleteFirst". The "deleteFirst" command includes a single argument referred to as "pattern". The "deleteFirst" command is a command that deletes the first instance of the specified "pattern". The argument "pattern" may be defined as regular expression.

Command 87*e* represents a command called "deleteAll". The "deleteAll" command includes a single argument referred to as "pattern". The "deleteAll" command is a command that deletes all instances of the specified "pattern" within the data. Again, the argument "pattern" may be defined as a regular expression.

Command 87*f* represents a command called "deleteRange". The "deleteRange" command includes arguments referred to as "start" and an argument referred to as "count". The "deleteRange" command is a command to delete a portion of the data that is "count" number of characters in length beginning at the position "start". Each of "start" and "count" are numerical values.

Command 87*g* represents a command called "translateFirst". The "translateFirst" command includes arguments referred to as "old" and "new". The argument "old" may be a pattern defined as a regular expression. The argument "new" is a character string. The "translateFirst" command replaces the first instance of the "old" pattern with the specified "new" character string.

Command 87*h* represents a command called "translateAll". The "translateAll" command includes arguments referred to as "old" and "new". Again, the argument "old" may be a pattern defined as a regular expression. The argument "new" is a character string. The "translateFirst" command replaces all instances of the "old" pattern with the specified "new" character string.

Command 87*i* represents a command called "tag". The "tag" command includes a single argument referred to as "arg" which is a character string. The "tag" command sets the XML tag associated with data to "arg" as the specified tag.

Command 87*j* represents a command called "accept". The "accept" command posts the current tag and data element pair to a router 103 (discussed later).

Command 87*k* represents a command called "route". The "route" command includes an argument referred to as "port", an argument referred to as "format", and a plurality of arguments each referred to as "tag". The "route" command posts the tag and data element pair for each identified "tag" to an output buffer of the output filter 106 (discussed later) for formatting in accordance with the "format" argument and subsequent output on the port identified in the "port" argument.

Command 87*m* represents a command called "passthrough". The "passthrough" command includes a single argument referred to as "arg". The argument "arg" may designate a buffer (such as the input buffer 105, one of the extraction buffers 106*a* or 106*b*, or the output buffer 110), content associated with a tag 109 (e.g. "$tagName"), or a literal string (e.g. "text"). The "passthrough" command passes the argument to the port previously identified in a route command or, if not designated, to the default port which, in the exemplary reader 10 is the communication module 26 for transmission to the remote data collection system.

It should be appreciated that each of the above described data manipulation commands is an exemplary command only. Those skilled in the art will recognize the benefit of including additional data manipulation commands within a command set 87 when implementing the present invention.

Returning to FIG. 5, the commands within the exemplary rules file 85 are organized in a nested pattern with second level rules only being applied if the first level rules is applicable. For example, rule 200 is a first level command and is applied to data within the input buffer 106. Rules 210, 220, 230, and 240 are second level rules and are applied only to the data extracted by rule 200 as it exists in the extraction buffer 106*a*.

On a logical basis, all of the commands shown in FIG. 5 are logically commands within the input filter 102 because such commands are for the purpose of extracting and manipulating data from the graphical barcode which is passed through to the default output port by the "passthrough" commands 216, 217, 223, 224, and 233 without being tagged to the router 103 (by "tag" and "accept" commands) and routed to the output filter 104 (by a "route" command).

As discussed, for purposes of illustrating this example, it is assumed that the decoder 72 will output the decoded value of the graphical code as a semicolon delimited file into the input buffer 105.

Following the decoder 72 writing the result to the input buffer 105, the data handling executable, following the machine readable instructions 74, executes the data manipulation commands 200–241 set forth in the exemplary rules file 85 as follows.

Command 200 is the "extract" command 87a. The "extract" command 87a is a data manipulation that extracts an argument referred to as "pattern" from the applicable buffer. In this case, because the command 200 is a first level command the relevant buffer is the input buffer 105. The "pattern", in this example, is a sequence of characters as represented by ".+"—with the "dot" being a "wild card" indicating any character and the "+" indicating one or more of the preceding. As such, command 200 will bring all data from the input buffer 105 to the extraction buffer 106a. The purpose of having command 200 is such that all subsequent manipulations are second level commands. Therefore, all subsequent operations can be "turned off" simply by disabling command 200 such that it matches nothing.

Command 210 is also an "extract" command 87a. In this case, because the command 210 is a second level command, the relevant buffer is the first level extraction buffer 106a (containing the results of the extraction at command 200). The "pattern" is a sequence of any two digits (0–9), followed by "/", followed by any two digits (0–9), followed by "/", followed by any two digits (0–9), followed by either a ";" or the end of the data. This sequence must be either at the beginning of the data or following a ";". This pattern corresponds to the date field, which as discussed, is formatted in the graphical code as "mm/dd/yy". The result of executing command 210 is to extract the "mm/dd/yy" pattern and its preceding and/or trailing ";" to the second level extraction buffer 106b.

Command 211 is a "deleteAll" command 87e at the third level of nesting and as such, is operating on the second level extraction buffer 106b. The "deleteFirst" command 87e is a data manipulation command that deletes all instances of the argument referred to as "pattern". The "pattern" for deletion by command 211 is the ";" which may exist either before or after the "mm/dd/yy" pattern in the second level extraction buffer 106b.

Command 212 is an "extractRange" command 87f. The "extractRange" command 87f is a data manipulation command to extract a portion of the data that is "count" number of characters in length beginning at the position "start". In this example, "start" is the first position and "count" is three characters. This results in extracting the three characters representing "mm/" to the third level extraction buffer 106c.

Command 213 is an "insert" command 87c at the third level of nesting such that it is operating on the second level extraction buffer 106b. The "insert" command 87c inserts at a specified position (in this example position 4) a specified string (in this example "the contents just extracted which is sitting in the third level extraction buffer 106c). This insertion results in the extraction buffer 106b now containing "mm/" inserted after "dd/" such that the contents of the buffer 106b is "dd/mm/yy".

Command 214 is also "insert" command 87c at the second level of nesting. Command 214 inserts, at position 7 of the second level extraction buffer 106b, the string "20". This results in converting the two-digit year to a four-digit year with the assumption that the year is more recent than 2000. Following execution of command 214, the second level extraction buffer 106b now contains "d/mm/20yy".

Command 215 is a "passthrough" command 87m. The "passthrough" command 87m passes the "arg" to the default output port. Because the "arg" is buffer and because command 215 is a second level command, the contents of the second level extraction buffer 106b are passed to the default output port.

Command 216 is also a "passthrough" command 87m. Command 216 passes the literal string "," to the default output port.

Command 220 is also an "extract" command 87a. Again, because the command 220 is a second level command, the relevant buffer is the first level extraction buffer 106a (containing the results of the extraction at command 200). The "pattern" is a sequence of any six alpha numeric characters (e.g. characters between 0–9, A–Z, and a–z) followed by either a ";" or the end of the data. This sequence must be either at the beginning of the data or following a ";". This pattern corresponds to the stock code field of the data encoded in the graphical code, which as discussed, is formatted as six alpha-numeric characters. The result of executing command 220 is to extract the six alpha-numeric characters and the preceding and/or trailing ";" to the second level extraction buffer 106b.

Command 221 is a "deleteAll" command 87e. Command 221, like command 211, deletes the preceding and/or trailing ";" from the extracted stock code in the second level extraction buffer 106b.

Commands 222 and 223 are both "passthrough" commands 87m. Command 222, like command 215 passes the contents of the second level extraction buffer 106b to the default output port. And, command 223, like command 216, passes the literal string "," to the default output port.

Command 230 is also an "extract" command 87a. Again, because the command 230 is a second level command, the relevant buffer is the first level extraction buffer 106a (containing the results of the extraction at command 200). The "pattern" is a sequence of any four numeric characters (e.g. characters between 0–9) followed by either a semicolon or be the end of the data. Again, the sequence must be either at the beginning of the data or following a semicolon. This pattern corresponds to the quantity field of the data encoded in the graphical code, which as discussed, is formatted as four numeric characters. The result of executing command 230 is to extract the four numeric characters and the preceding and/or trailing semicolons to the second level extraction buffer 106b.

Command 231 is a "deleteAll" command 87e. Command 231, like command 211, deletes the preceding and/or trailing semicolons from the extracted quantity in the second level extraction buffer 106b.

Commands 232 is a "passthrough" command 87m. Command 232, like command 215 passes the contents of the second level extraction buffer 106b to the default output port. Note that no additional comma is passed after the quantity because the quanity is the last item in the comma delimited data passed from the reader 10.

It should be appreciated that the result of performing rules 200–233 is the passing of "dd/mm/20yy, stock code, quantity" to the default output port:

Command 240 is also an "extract command 87a. Again, because the command 230 is a second level command, the relevant buffer is the first level extraction buffer 106a (containing the results of the extraction at command 200). The "pattern" is any characters (the same extraction pattern as command 200). The purpose of command 240 followed by the "deleteFirst" command 241 is to delete any data remaining in the first level extraction buffer 106a. This prevents such data from being output by default.

In a first embodiment of the present invention, the interpreter module 84 includes a compiler 128 which reads the data manipulation commands set forth in the rules file 85 and compiles machine readable instructions 74. The interpreter module 84 further includes a data handling executable 86 (virtual machine) which, when executed from memory, accesses the machine readable instructions 74 to perform the translation, routing and manipulations of the decoded data 134.

In a second embodiment of the present invention, the interpreter module 84 includes a compiler 128 which reads the data manipulation commands set forth in the rules file 85 and compiles a data handling executable file 86 in native machine language. As such, when the data handling executable file 86 is executed from memory 70, it performs the translation, routing, and manipulations of the decoded data 134.

Figure 6:
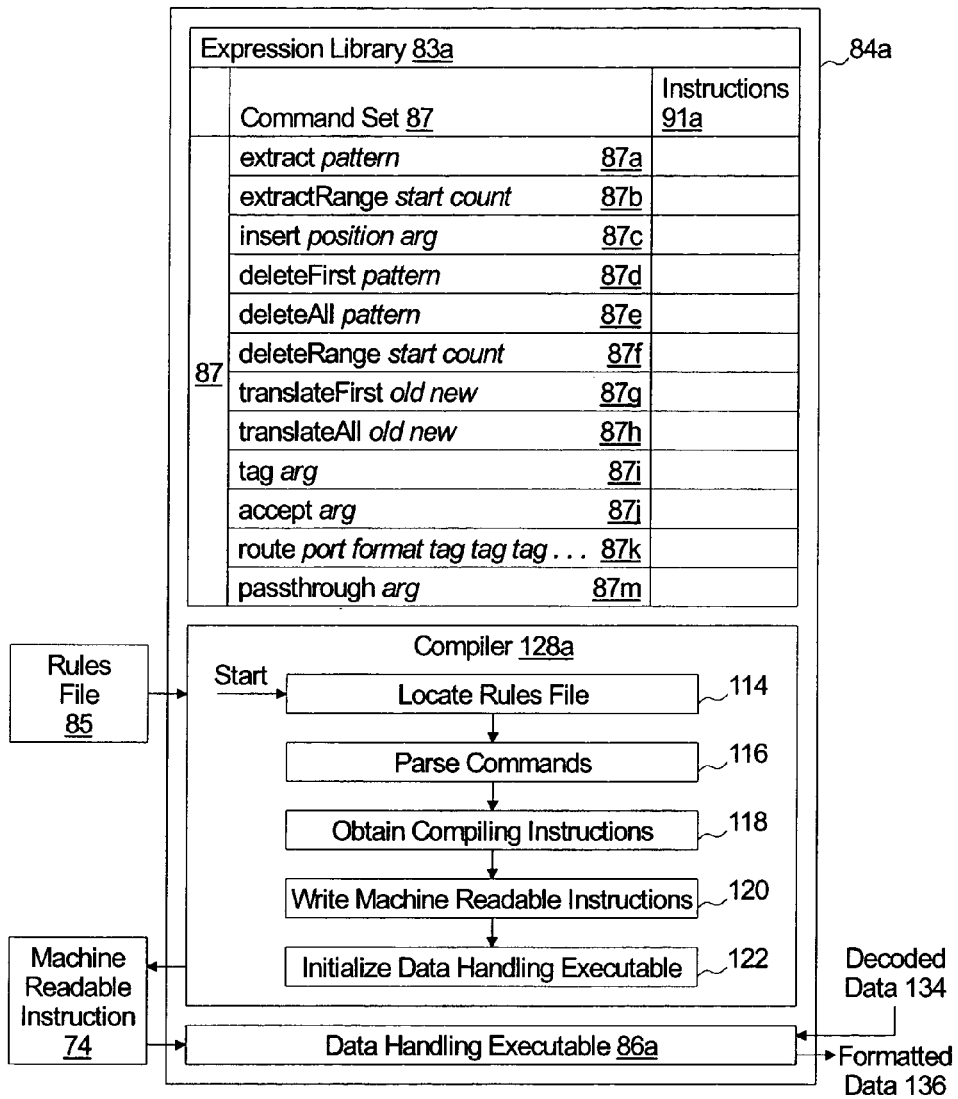
FIG. 6 is a block diagram representing an interpreter module in accordance with a first embodiment of the present invention.

The block diagram of FIG. 6 is useful for describing structure and operation of the first embodiment of the interpreter module 84 referred to as interpreter module 84a. The interpreter module 84a may be of an architecture commonly known as a "Virtual Machine". The interpreter module 84a includes a compiler module 128a, a data handling module (e.g. a virtual machine executable module) 86a, and an expression library 83a. Those skilled in the art will recognize that the functions of the interpreter module 84a may be embodied in a general purpose scripting engine such as Awk, Perl, Python, JavaScript and other similar systems.

The expression library 83a comprises the command set 87 which is a plurality of data manipulation commands 87a–87m recognized by the compiler module 128. In association with each data manipulation command 87a–87m, the expression library 83a includes instructions 91a for compiling machine readable instructions 74 which, when retrieved by the data handling module 86a, instruct the data handling module to execute the data manipulation command 87a–87m.

The compiler module 128a comprises native machine executable code which, when executed by the processor 20: i) locates the rules file 85 at step 114; ii) parses the rules file 85 to obtain the plurality of data manipulation commands within the rules file 85 at step 116; iii) obtains applicable compiling instructions 91a from the expression library 83a at step 118; iii) compiles the machine readable instructions 74 at step 120; and initializes the data handling executable 86a at step 122.

In the exemplary embodiment the compiler module 128a is run at power up of the reader 10 and compiles the machine readable instructions 74 only at power up.

To enable the compiler module 128a to locate the rules file 85 at step 114, the rules file 85 may be distinguishable from other files stored in the non-volatile storage 130 by: i) its storage at a predefined location within the non-volatile storage such as a predetermined directory; ii) its storage under a file name with a predefined extension; and/or ii) its inclusion of predetermined file characteristics such as leading characters that identify the file as a rules file 85.

As discussed, the rules file 85 is a source code or script file. Each data manipulation command within the rules file 85 is: i) a data manipulation command 87 defined within the expression library 83a; ii) formatted in a predefined manner for recognition by the compiler module 128a; and includes arguments (if applicable) that match predefined argument formats that associate with the command 87. As such, parsing of such a rules file 85 may be accomplished at step 116 utilizing known parsing techniques.

The steps 118 and 120, representing: i) obtaining the compiling instructions 91a; and ii) writing the machine readable instructions 74, may be performed utilizing known techniques for compiling instructions interpretable by a virtual machine.

The data handling executable module 86a comprises native machine executable code which, when executed by the processor 20, retrieves the machine readable instructions 74 and, in the process of implementing the machine readable instructions 74, performs the data manipulation commands defined within the rules file 85. As discussed, the data handling executable 86a may be a system commonly known as a virtual machine that has been written in native machine executable code for operation by the processor 20.

The above described first embodiment is an implementation typical of virtual machine technology which processes the entire script into a convenient machine-readable format and then interprets (or executes) the machine-readable instructions in the virtual machine. An alternative implementation could include an interpreter often referred to as a "true interpreter" or a "strictly interpretive virtual machine" which does not parse the entire script in advance and compile machine-readable instructions. As such, the "true interpreter" would use the source or human-readable script directly (parsing and reparsing as necessary) for execution. The use of a convenient machine-readable format as an intermediate format represents the evolution in interpreter implementations—increasing the execution performance by doing the relatively time consuming text parsing only once at start up rather than repeatedly during execution. Those skilled in the art will recognize that use of a machine-readable intermediary step or a "true interpreter" are equivalent implementations and, if a "true interpreter" is utilized, the source rules file and the machine readable instructions are the same entity and the compiler and the data handling executable are merged.

Figure 7:
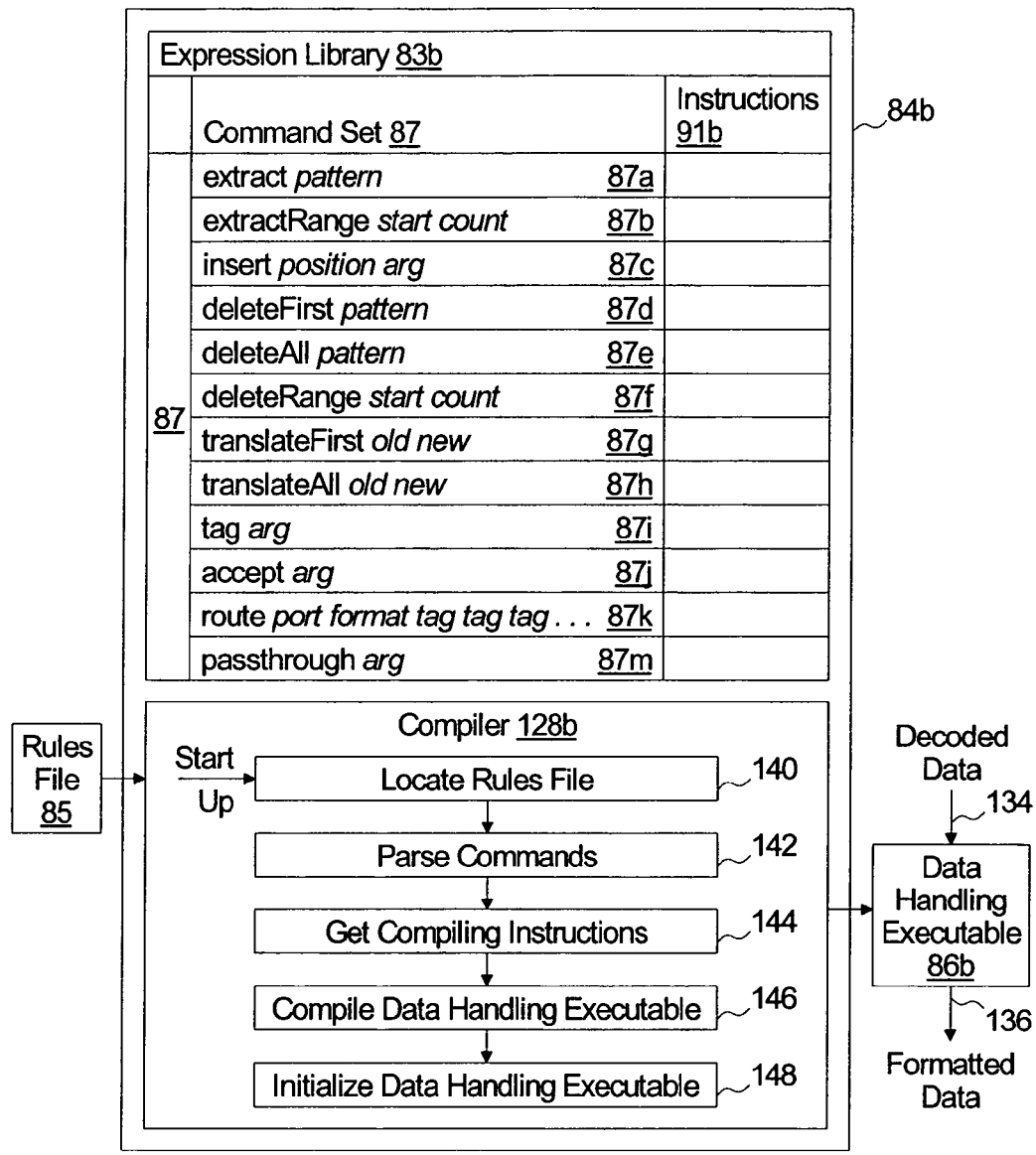
FIG. 7 is a block diagram representing an interpreter module in accordance with a second embodiment of the present invention.

The block diagram of FIG. 7 represents the second embodiment of the present invention wherein the interpreter module 84, referred to as interpreter module 84b, compiles the data handling executable file 86b in native machine code in accordance with the data manipulation commands of the rules file 85. The interpreter module 84b comprises a compiler 128b and an expression library 83b.

The expression library 83b comprises the command set 87 recognized by the compiler module 128b. In association with each data manipulation command 87a–87m, the expression library 83b includes instructions 91b for compiling the data handling executable code, in native machine readable code, for inclusion in the data handling executable file 86b such that when executed by the processor 20, the data manipulation command is performed.

The compiler module 128b comprises native machine executable code which, when executed by the processor 20: i) locates the rules file 85 at step 140; ii) parses the rules file 85 to obtain the plurality of data manipulation commands within the rules file 85 at step 142; iii) obtains applicable compiling instructions 91b from the expression library 83b at step 144; iii) compiles the data handling executable file 86b at step 146; and starts the data handling executable 86b at step 148.

In this second exemplary embodiment the compiler module 128b is run at power up of the reader 10 and compiles (and loads into memory 70) the data handling executable file 86b only at power up.

Similar to the first embodiment, to enable the compiler module 128b to locate the rules file 85 at step 140, the rules file 85 may be distinguishable from other files stored in the non-volatile storage 130 by: i) its storage at a predefined location within the non-volatile storage such as a predetermined directory; ii) its storage under a file name with a predefined extension; and/or ii) its inclusion of predetermined file characteristics such as leading characters that identify the file as a rules file 85.

As discussed, the rules file 85 is a source code or script file and each of the data manipulation commands within the rules file is: i) a data manipulation command 87 defined within the expression library 83b; ii) formatted in a predefined manner for recognition by the compiler module 128b; and include arguments (if applicable) that match predefined argument formats that associate with the command 87. As such, steps 144 and 146, representing: i) obtaining the compiling instructions 91b; and ii) compiling the data handling executable 86b, may be performed utilizing known techniques for compiling source code to native machine language code.

Although the invention has been shown and described with respect to certain preferred embodiments, it is obvious that equivalents and modifications will occur to others skilled in the art upon the reading and understanding of the specification.

For example, the rules file, in the exemplary embodiment, is a source code or script file written in human perceivable form. However, those skilled in the art will recognize that a rules file 85 can be partially compiled or written in a machine readable form prior to loading into the non-volatile storage 130. In which case, the command set 87 would include machine readable commands rather than human perceivable commands.

In another example, the first embodiment of the invention compiles a machine readable instruction file for directing operation of a data handling executable file and the second embodiment compiles a native machine code data handling executable file in accordance with the rules file. Those skilled in the art will recognize that there are varying levels of interpretable and executable code that exist between human perceivable source code and machine code and any such level may be chosen without deviating form the scope of the present invention.

It is envisioned that after reading and understanding the present invention those skilled in the art may envision other processing states, events, and processing steps to further the objectives of the present invention. The present invention includes all such equivalents and modifications, and is limited only by the scope of the following claims.

What is claimed is:

1. A data collection device (10) for reading a machine readable data storage medium (38) comprising data encoded in a readable format, the data collection device (10) comprising:
   a) a medium reading system (21) for detecting a characteristic of the machine readable data storage medium (38) and generating digital data representative of the characteristic;
   b) a processor (20) operating an embedded decoder system (76) comprising a decoder module (72) and an interpreter module (84);
      i) the decoder module (76) receiving the digital data, determining the data encoded in the machine readable data storage medium, and generating decoded data (134); and
      ii) the interpreter module (84) receiving the decoded data (134) and manipulating the decoded data (134) in accordance with the plurality of data manipulation commands defined in a rules file (85) to generate formatted data (136), wherein the data manipulation commands are logically structured to implement an input filter, a router, and an output filter.

2. The data collection device of claim 1, further comprising a communication module (26) coupled to the processor and transferring the formatted data to a remote system.

3. The data collection device of claim 1 wherein:
   the interpreter module 84 comprises an expression library (83), the expression library (83) including a plurality of data manipulation commands and, in association with each of the plurality of data manipulation commands, an instruction for performing the data manipulation command (89); and
   the interpreter module (84) provides for manipulating the decoded data (134) by, for each data manipulation defined in the rules file (85), performing the instruction (91) associated with the data manipulation.

4. A data collection device (10) for reading a machine readable data storage medium (38) comprising data encoded in a readable format, the data collection device (10) comprising:
   a) a medium reading system (21) for detecting a characteristic of the machine readable data storage medium (38) and generating digital data representative of the characteristic;
   b) a processor (20) operating an embedded decoder system (76) comprising a decoder module (72) and an interpreter module (84);
      i) the decoder module (76) receiving the digital data, determining the data encoded in the machine readable data storage medium, and generating decoded data (134); and
      ii) the interpreter module (84) receiving the decoded data (134) and manipulating the decoded data (134) in accordance with the plurality of data manipulation commands defined in a rules file (85) to generate formatted data (136);
   wherein the interpreter module 84 comprises an expression library (83), the expression library (83) including a plurality of data manipulation commands and, in association with each of the plurality of data manipulation commands, an instruction for performing the data manipulation command (89);
   wherein the interpreter module (84) provides for manipulating the decoded data (134) by, for each data manipulation defined in the rules file (85), performing the instruction (91) associated with the data manipulation;
   wherein the instruction associated with each data manipulation is a compiling instruction for building executable code for performing the data manipulation;
   wherein the interpreter module (84) comprises a compiler module (128), wherein the compiler module (128) uses the compiling instruction to compile a data handling module (86) for manipulating the decoded data in accordance with the plurality of data manipulation commands defined in the rules file; and
   wherein the interpreter module (84) manipulates the decoded data (134) by operating the data handling module (86).

5. The data collection device of claim 4, wherein the rules file is a script file and the plurality of data manipulation commands are defined utilizing text commands and arguments within a programming language recognized by the compiler module (128).

6. The data collection device of claim 5, wherein the plurality of data manipulation commands (87) included in the expression library (83) defines the universe of data manipulation commands available for use in the rules file (85).

7. A data collection device (10) for reading a machine readable data storage medium (38) comprising data encoded in a readable format, the data collection device (10) comprising:
   a) a medium reading system (21) for detecting a characteristic of the machine readable data storage medium (38) and generating digital data representative of the characteristic;
   b) a processor (20) operating an embedded decoder system (76) comprising a decoder module (72) and an interpreter module (84);
      i) the decoder module (76) receiving the digital data, determining the data encoded in the machine readable data storage medium, and generating decoded data (134); and
      ii) the interpreter module (84) receiving the decoded data (134) and manipulating the decoded data (134) in accordance with the plurality of data manipulation commands defined in a rules file (85) to generate formatted data (136);
   wherein the interpreter module 84 comprises an expression library (83), the expression library (83) including a plurality of data manipulation commands and, in association with each of the plurality of data manipulation commands, an instruction for performing the data manipulation command (89);
   wherein the interpreter module (84) provides for manipulating the decoded data (134) by, for each data manipulation defined in the rules file (85), performing the instruction (91) associated with the data manipulation;
   wherein the instruction associated with each data manipulation command (89) is a compiling instruction for compiling machine readable instructions which are recognizable by a data handling module (86);
   wherein the interpreter module (84) comprises a compiler module (128), wherein the compiler module uses the compiling instruction to compile machine readable instructions which instruct the data handling module (86) to manipulate the decoded data in accordance with the plurality of data manipulation commands defined in the rules file; and
   wherein the executable code block (86) manipulates the decoded data (134) by retrieving the machine readable instructions and performing the data manipulations in accordance to the machine readable instructions.

8. The data collection device of claim 7, wherein the rules file is a script file and the plurality of data manipulation commands are defined utilizing text commands and arguments within a programming language recognized by the compiler module (128).

9. The data collection device of claim 8, wherein the plurality of data manipulation commands (87) included in the expression library (83) defines the universe of data manipulation commands available for use in the rules file (85).

10. A data collection device (10) for reading a machine readable data storage medium (38) comprising data encoded a readable format, the data collection device (10) comprising:
   a) a medium reading system (21) for detecting a characteristic of the machine readable data storage medium and generating digital data representative of the characteristic;
   b) a memory comprising instructions executable by a processor, the instructions comprising:
      i) a decoder module (76) comprising executable code for receiving the digital data, determining the data encoded in the readable format, and generating decoded data (134); and
      ii) an interpreter module (84) comprising executable code for reading a plurality of data manipulation commands from a rules file and manipulating the decoded data (134) in accordance with the plurality of data manipulation commands to generate formatted data (136), wherein the data manipulation commands are logically structured to implement an input filter, a router, and an output filter.

11. The data collection device of claim 10, further comprising a communication module (26) coupled to the processor and transferring the formatted data (136) to a remote system.

12. The data collection device of claim 10, wherein:
   the interpreter module 84 comprises an expression library (83), the expression library (83) including a plurality of data manipulation commands and, in association with each of the plurality of data manipulation commands, an instruction for performing the data manipulation command (89); and
   the interpreter module (84) provides for manipulating the decoded data (134) by, for each data manipulation defined in the rules file (85), performing the instruction (91) associated with the data manipulation.

13. A data collection device (10) for reading a machine readable data storage medium (38) comprising data encoded a readable format, the data collection device (10) comprising:
   a) a medium reading system (21) for detecting a characteristic of the machine readable data storage medium and generating digital data representative of the characteristic;
   b) a memory comprising instructions executable by a processor, the instructions comprising:
      i) a decoder module (76) comprising executable code for receiving the digital data, determining the data encoded in the readable format, and generating decoded data (134); and
      ii) an interpreter module (84) comprising executable code for reading a plurality of data manipulation commands from a rules file and manipulating the decoded data (134) in accordance with the plurality of data manipulation commands to generate formatted data (136);
   wherein the interpreter module 84 comprises an expression library (83), the expression library (83) including a plurality of data manipulation commands and, in association with each of the plurality of data manipulation commands, an instruction for performing the data manipulation command (89);
   wherein the interpreter module (84) provides for manipulating the decoded data (134) by, for each data manipulation defined in the rules file (85), performing the instruction (91) associated with the data manipulation:
   wherein the instruction associated with each data manipulation is a compiling instruction for building executable code for performing the data manipulation;
   wherein the interpreter module (84) comprises a compiler module (128), wherein the compiler module (128) uses the compiling instructions to compile a data handling module (86) for manipulating the decoded data in accordance with the plurality of data manipulation commands defined in the rules file (85); and wherein the interpreter module (84) manipulates the decoded data (134) by operating the data handling module (86).

14. The data collection device of claim 13, wherein the rules file is a script file and the plurality of data manipulation commands are defined utilizing text commands and arguments within a programming language recognized by the compiler module (128).

15. The data collection device of claim 14, wherein the plurality of data manipulation commands (87) included in the expression library (83) defines the universe of data manipulation commands available for use in the rules file (85).

16. A data collection device (10) for reading a machine readable data storage medium (38) comprising data encoded a readable format, the data collection device (10) comprising:
   a) a medium reading system (21) for detecting a characteristic of the machine readable data storage medium and generating digital data representative of the characteristic;
   b) a memory comprising instructions executable by a processor, the instructions comprising:
      i) a decoder module (76) comprising executable code for receiving the digital data, determining the data encoded in the readable format, and generating decoded data (134); and
      ii) an interpreter module (84) comprising executable code for reading a plurality of data manipulation commands from a rules file and manipulating the decoded data (134) in accordance with the plurality of data manipulation commands to generate formatted data (136);
   wherein the interpreter module 84 comprises an expression library (83), the expression library (83) including a plurality of data manipulation commands and, in association with each of the plurality of data manipulation commands, an instruction for performing the data manipulation command (89):
   wherein the interpreter module (84) provides for manipulating the decoded data (134) by, for each data manipulation defined in the rules file (85), performing the instruction (91) associated with the data manipulation;
   wherein the instruction associated with each data manipulation command (89) is a compiling instruction for compiling machine readable instructions which are recognizable by a data handling module (86);
   wherein the interpreter module (84) comprises a compiler module (128), wherein the compiler module uses the compiling instruction to compile machine readable instructions which instruct the data handling module (86) to manipulate the decoded data in accordance with the plurality of data manipulation commands defined in the rules file; and
   wherein the executable code block (86) manipulates the decoded data (134) by retrieving the machine readable instructions and performing the data manipulations in accordance to the machine readable instructions.

17. The data collection device of claim 16, wherein the rules file is a script file and the plurality of data manipulation commands are defined utilizing text commands and arguments within a programming language recognized by the compiler module (128).

18. The data collection device of claim 17, wherein the plurality of data manipulation commands (87) included in the expression library (83) defines the universe of data manipulation commands available for use in the rules file (85).

19. A method for decoding a machine readable data storage medium comprising data encoded in a machine readable format and manipulating the decoded data for output by a data collection device, the method comprising:
   a) detecting the data encoded in the machine readable format and generating digital data representative thereof;
   b) passing the digital data to an embedded decoder system which:
      i) determines the data encoded in the data elements and generating decoded data; and
      ii) manipulating the decoded data in accordance with the plurality of data manipulation commands defined in a rules file to generate formatted data, wherein the data manipulation commands are logically structured to implement an input filter, a router, and an output filter.

20. The method of claim 19, further comprising transferring the formatted data to a remote system.

21. The method of claim 19, wherein:
   the step of manipulating the decoded data comprises, for each data manipulation command defined in the rules file:
      obtaining from an expression library an instruction associated with the data manipulation command; and
   performing the instruction.

22. A method for decoding a machine readable data storage medium comprising data encoded in a machine readable format and manipulating the decoded data for output by a data collection device, the method comprising:
   a) detecting the data encoded in the machine readable format and generating digital data representative thereof;
   b) passing the digital data to an embedded decoder system which:
      i) determines the data encoded in the data elements and generating decoded data ; and
      ii) manipulates the decoded data in accordance with the plurality of data manipulation commands defined in a rules file to generate formatted data; and
   c) transferring the formatted data to a remote system;
   wherein the instruction associated with each data manipulation command is a compiling instruction for building executable code for performing the data manipulation; and
   wherein the step of manipulating the decoded data comprises:
      using the compiling instruction to compile a data handling module for manipulating the decoded data in accordance with the plurality of data manipulation commands defined in the rules file; and
   manipulating the decoded data by operating the data handling module.

23. The method of claim 22, wherein the rules file is a script file and the plurality of data manipulation commands are defined utilizing text commands and arguments within a pre-defined programming language.

24. The method of claim 23, wherein the plurality of data manipulation commands included in the expression library defines the universe of data manipulation commands available for use in the rules file.

25. A method for decoding a machine readable data storage medium comprising data encoded in a machine readable format and manipulating the decoded data for output by a data collection device, the method comprising:
a) detecting the data encoded in the machine readable format and generating digital data representative thereof;
b) passing the digital data to an embedded decoder system which:
i) determines the data encoded in the data elements and generating decoded and
ii) manipulates the decoded data in accordance with the plurality of data manipulation commands defined in a rules file to generate formatted data; and
c) transferring the formatted data to a remote system;
wherein the instruction associated with each data manipulation command is a compiling instruction for compiling machine readable instructions which are recognizable by a data handling module; and
wherein the step of manipulating the decoded data comprises:
using the compiling instruction to compile machine readable instructions which instruct the data handling module to manipulate the decoded data in accordance with the plurality of data manipulation commands defined in the rules file; and
manipulating the decoded data by operating the data handling module to retrieve the machine readable instructions and perform the data manipulations in accordance to the machine readable instructions.

26. The method of claim 25, wherein the rules file is a script file and the plurality of data manipulation commands are defined utilizing text commands and arguments within a programming language recognized by the compiler module.

27. The method of claim 26, wherein the plurality of data manipulation commands included in the expression library defines the universe of data manipulation commands available for use in the rules file.

28. A method for decoding a machine readable data storage medium comprising data encoded in a machine readable format and manipulating the decoded data for output by a data collection device, the method comprising:
a) detecting the data encoded in a machine readable format from a machine readable data storage medium (38) and generating digital data representative thereof;
b) passing the digital data representative of the code elements to a memory;
c) executing from the memory, native machine code instructions comprising:
i) decoder instructions for retrieving the digital data, determining the data encoded in the data elements, and generating decoded data; and
ii) interpreter instructions for reading a plurality of data manipulation commands from a rules file and manipulating the decoded data in accordance with the plurality of data manipulation commands to generate formatted data, wherein the data manipulation commands are logically structured to implement an input filter, a router, and an output filter.

29. The method of claim 28, further comprising transferring the formatted data to a remote system.

30. The method of claim 28, wherein:
the step of manipulating the decoded data comprises, for each data manipulation command defined in the rules file:
obtaining from an expression library an instruction associated with the data manipulation command; and
performing the instruction.

31. A method for decoding a machine readable data storage medium comprising data encoded in a machine readable format and manipulating the decoded data for output by a data collection device, the method comprising:
a) detecting the data encoded in a machine readable format from a machine readable data storage medium (38) and generating digital data representative thereof;
b) passing the digital data representative of the code elements to a memory;
c) executing from the memory, native machine code instructions comprising:
i) decoder instructions for retrieving the digital data, determining the data encoded in the data elements, and generating decoded data; and
ii) interpreter instructions for reading a plurality of data manipulation commands from a rules file and manipulating the decoded data in accordance with the plurality of data manipulation commands to generate formatted data;
wherein the step of manipulating the decoded data comprises, for each data manipulation command defined in the rules file:
obtaining from an expression library an instruction associated with the data manipulation command; and
performing the instruction;
wherein the instruction associated with each data manipulation is a compiling instruction for building executable code for performing the data manipulation; and
wherein the step of manipulating the decoded data comprises:
using the compiling instruction to compile a data handling module for manipulating the decoded data in accordance with the plurality of data manipulation commands defined in the rules file; and
manipulating the decoded data by operating the data handling module.

32. The method of claim 31, wherein the rules file is a script file and the plurality of data manipulation commands are defined utilizing text commands and arguments within a programming language recognized by the compiler module (128).

33. The method of claim 32, wherein the plurality of data manipulation commands (87) included in the expression library (83) defines the universe of data manipulation commands available for use in the rules file (85).

34. A method for decoding a machine readable data storage medium comprising data encoded in a machine readable format and manipulating the decoded data for output by a data collection device, the method comprising:
a) detecting the data encoded in a machine readable format from a machine readable data storage medium (38) and generating digital data representative thereof;
b) passing the digital data representative of the code elements to a memory; and
c) executing from the memory, native machine code instructions comprising:
i) decoder instructions for retrieving the digital data, determining the data encoded in the data elements, and generating decoded data; and
ii) interpreter instructions for reading a plurality of data manipulation commands from a rules file and manipulating the decoded data in accordance with the plurality of data manipulation commands to generate formatted data;
wherein the step of manipulating the decoded data comprises, for each data manipulation command defined in the rules file:

obtaining from an expression library an instruction associated with the data manipulation command; and performing the instruction;

wherein the instruction associated with each data manipulation command is a compiling instruction for compiling machine readable instructions which are recognizable by a data handling module; and wherein the step of manipulating the decoded data comprises:

using the compiling instruction to compile machine readable instructions which instruct the data handling module to manipulate the decoded data in accordance with the plurality of data manipulation commands defined in the rules file; and manipulating the decoded data by operating the data handling module to retrieve the machine readable instructions and perform the data manipulations in accordance to the machine readable instructions.

35. The method of claim 34, wherein the rules file is a script file and the plurality of data manipulation commands are defined utilizing text commands and arguments within a programming language recognized by the compiler module (128).

36. The method of claim 35, wherein the plurality of data manipulation commands (87) included in the expression library (83) defines the universe of data manipulation commands available for use in the rules file (85).

* * * * *

UNITED STATES PATENT AND TRADEMARK OFFICE
CERTIFICATE OF CORRECTION

PATENT NO. : 7,097,099 B2  
APPLICATION NO. : 10/774245  
DATED : August 29, 2006  
INVENTOR(S) : Paul Hepworth et al.

Page 1 of 1

It is certified that error appears in the above-identified patent and that said Letters Patent is hereby corrected as shown below:

In Column 18, line 60, please replace "manipulation:" with --manipulation;--.  
In Column 19, line 41, please replace "command (89):" with --command (89);--.  
In Colum 21, line 9, please replace "decoded and" with --decoded data; and--.

Signed and Sealed this

Twelfth Day of December, 2006

JON W. DUDAS  
*Director of the United States Patent and Trademark Office*